United States Patent [19]
Jerue

[11] 3,947,951
[45] Apr. 6, 1976

[54] TOOL CHANGER

[75] Inventor: Richard A. Jerue, Birmingham, Mich.

[73] Assignee: De Vlieg Machine Company, Royal Oak, Mich.

[22] Filed: Aug. 31, 1973

[21] Appl. No.: 393,497

[52] U.S. Cl. ............................................. 29/568
[51] Int. Cl.² ....................................... B23Q 3/157
[58] Field of Search ................................... 29/568

[56] References Cited
UNITED STATES PATENTS

| | | | |
|---|---|---|---|
| 3,242,568 | 3/1966 | Flannery et al. | 29/568 |
| 3,516,149 | 6/1970 | Mickas | 29/568 |
| 3,689,988 | 9/1972 | Jerue | 29/568 |
| 3,760,491 | 9/1973 | Zankl et al. | 29/568 |
| 3,811,179 | 5/1974 | Anderson | 29/568 |
| 3,837,070 | 9/1974 | Ochiai et al. | 29/568 |

*Primary Examiner*—Travis S. McGehee
*Assistant Examiner*—Z. R. Bilinsky
*Attorney, Agent, or Firm*—Harness, Dickey & Pierce

[57] ABSTRACT

A machine tool having an automatic tool changer for interchanging cutting tools between the machine spindle and a tool storage wheel. The shanks of the tools are fitted in special "pot-type" holders which support the tools in assigned positions on the storage wheel. A shuttle extracts a selected tool and its holder from the storage wheel and transports them to an interchange position adjacent the machine spindle. At the interchange position a newly selected tool is extracted from its holder and is inserted into the spindle while the previously used tool is inserted into the holder in which the newly selected tool was delivered to the interchange position. The old tool is then returned in this holder to its assigned position on the storage wheel.

16 Claims, 16 Drawing Figures

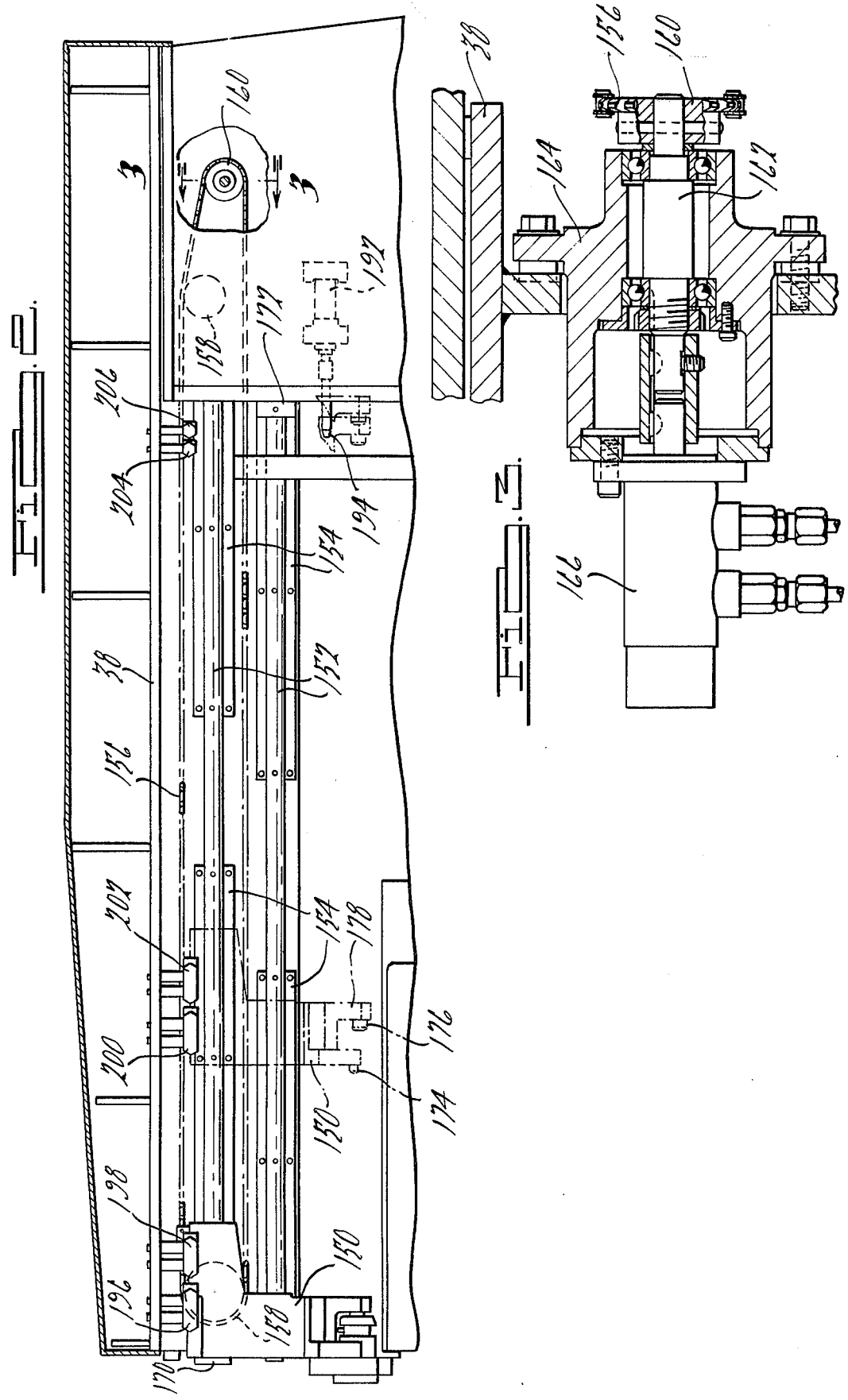

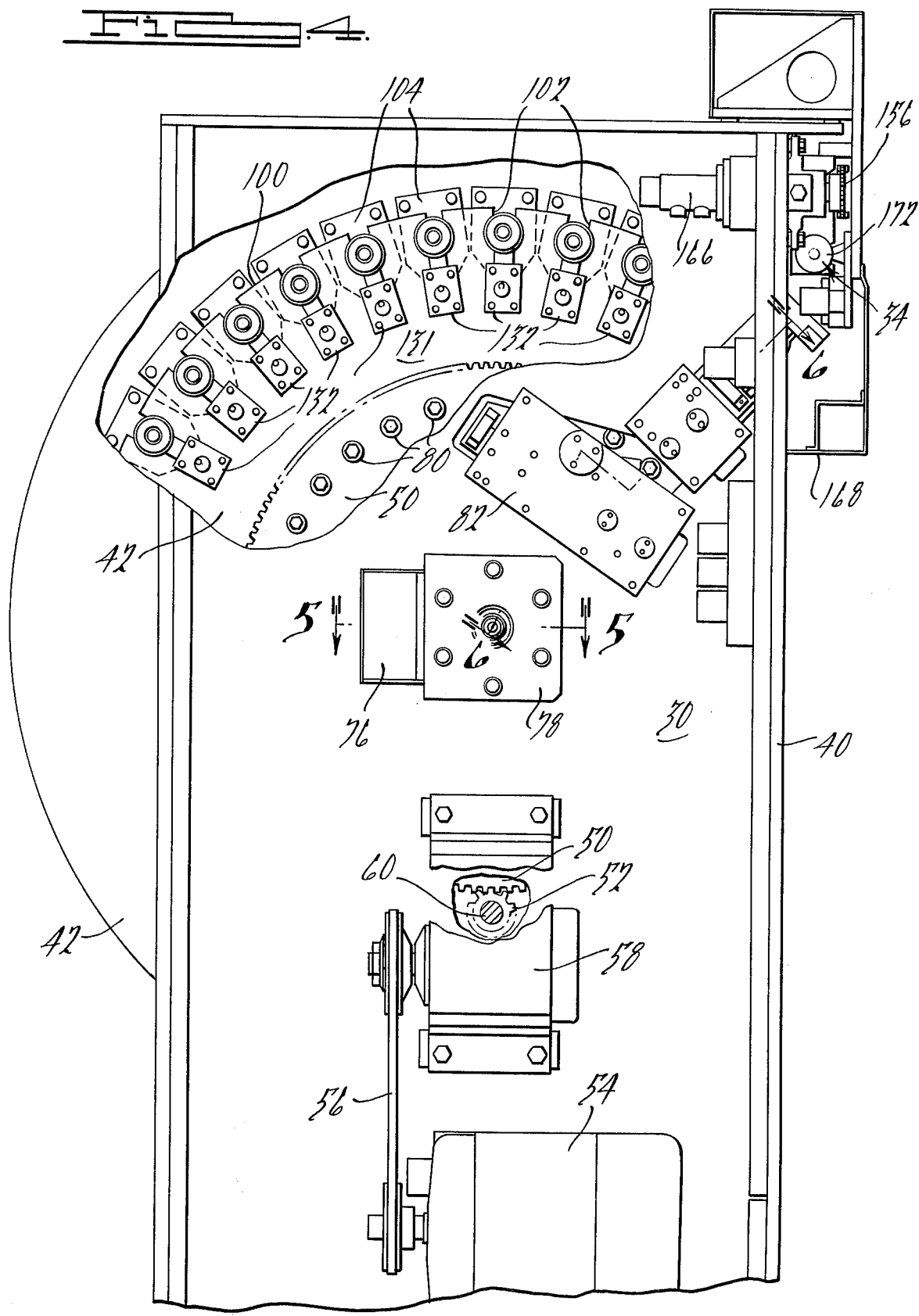

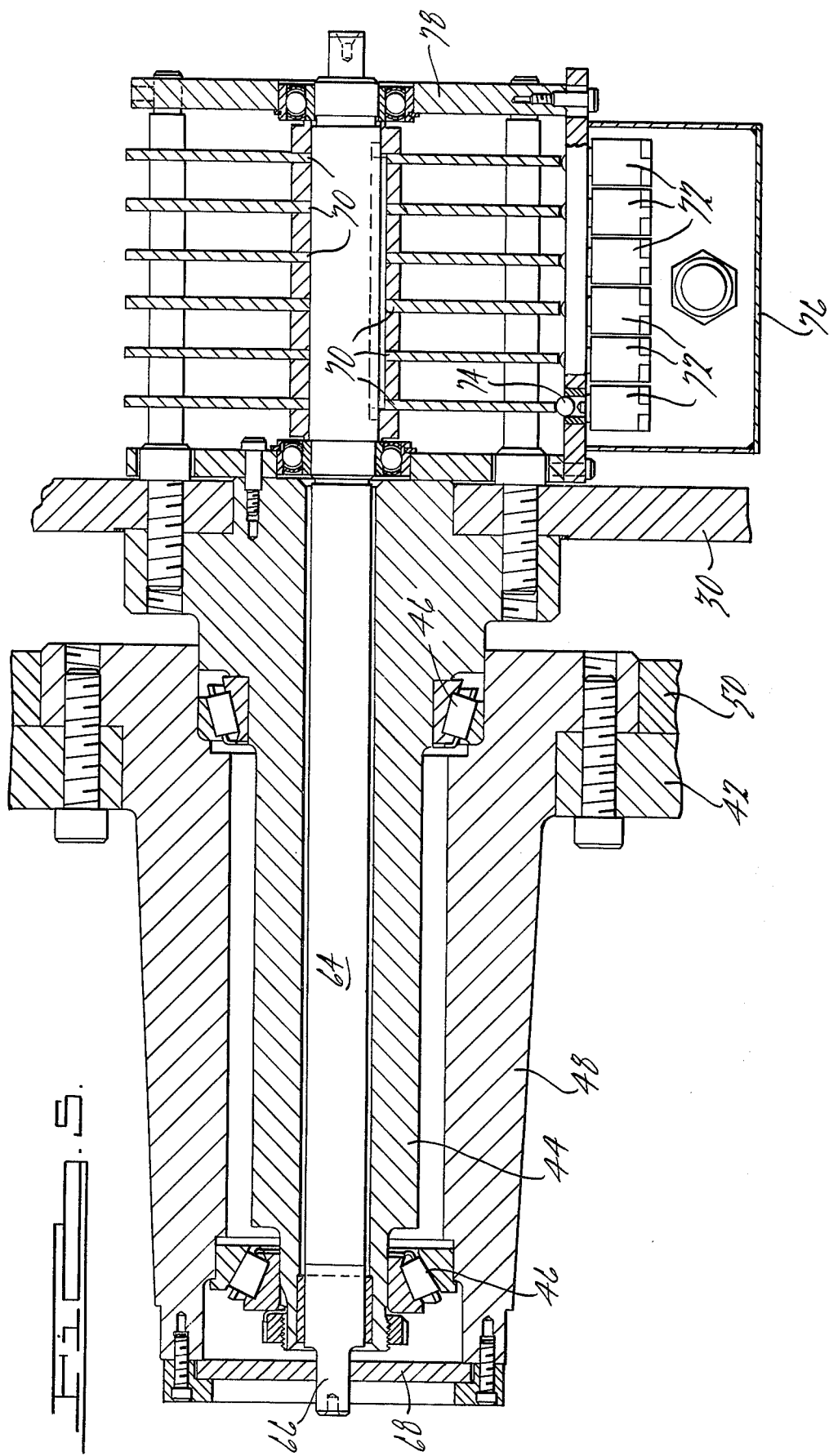

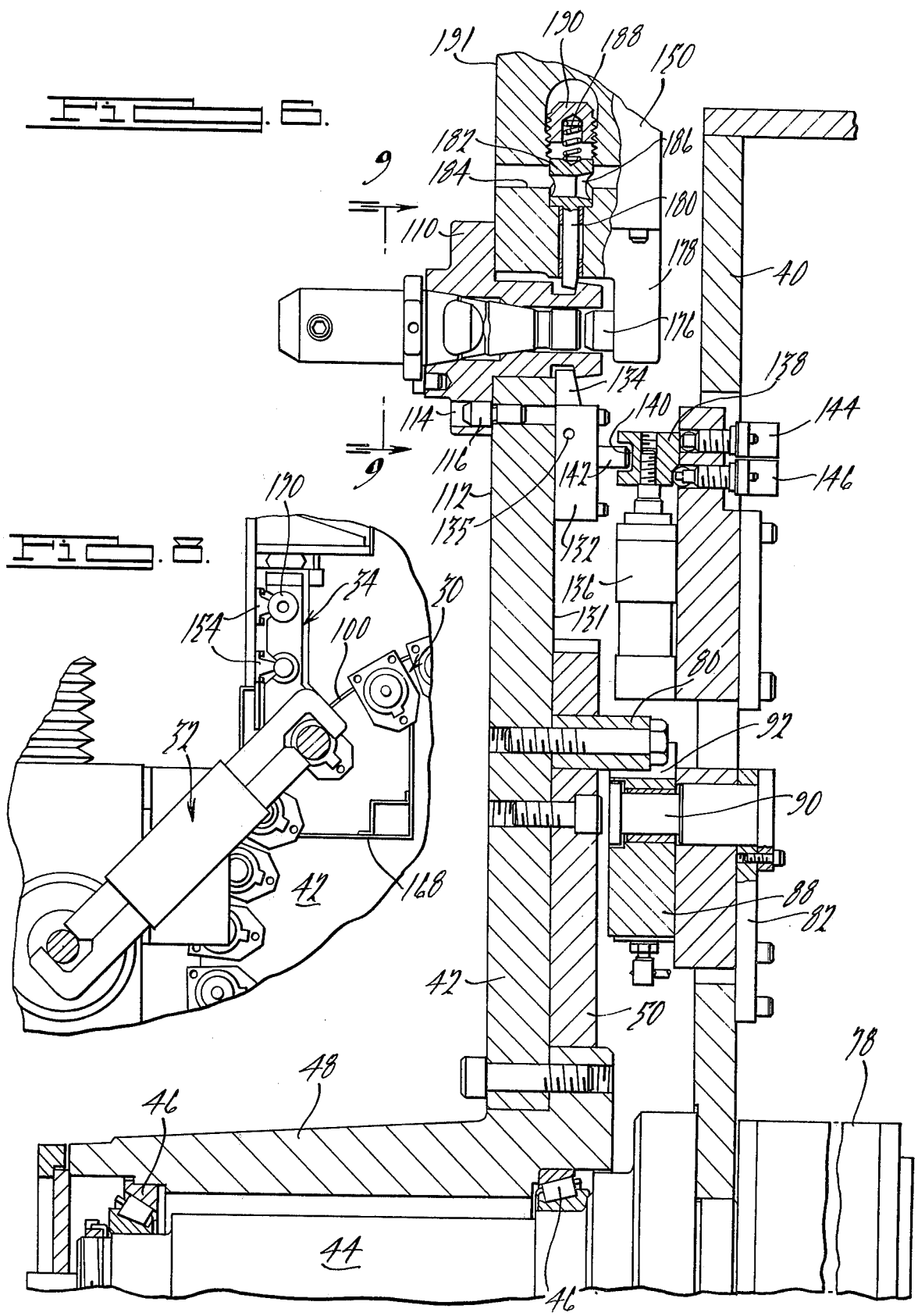

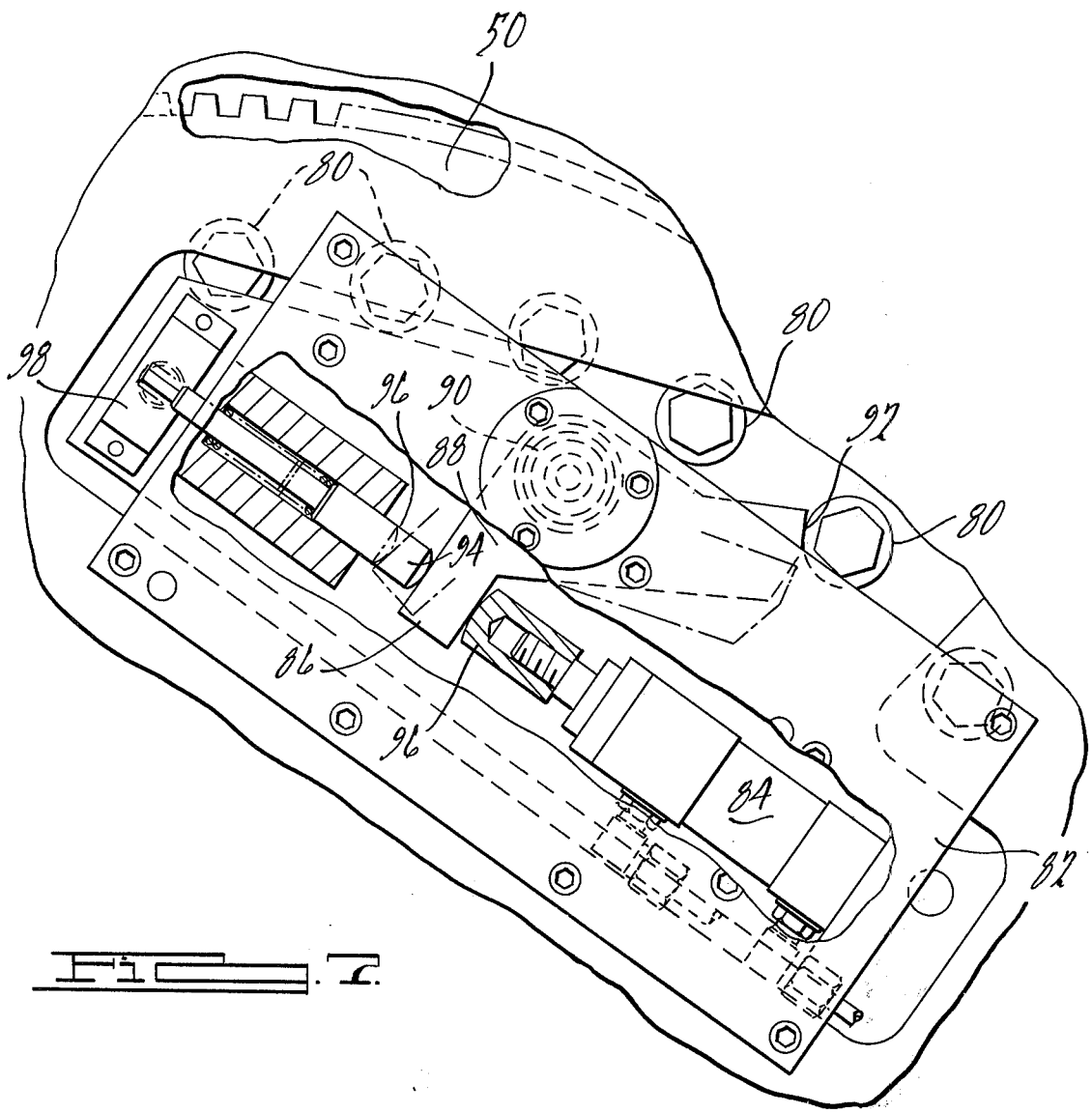

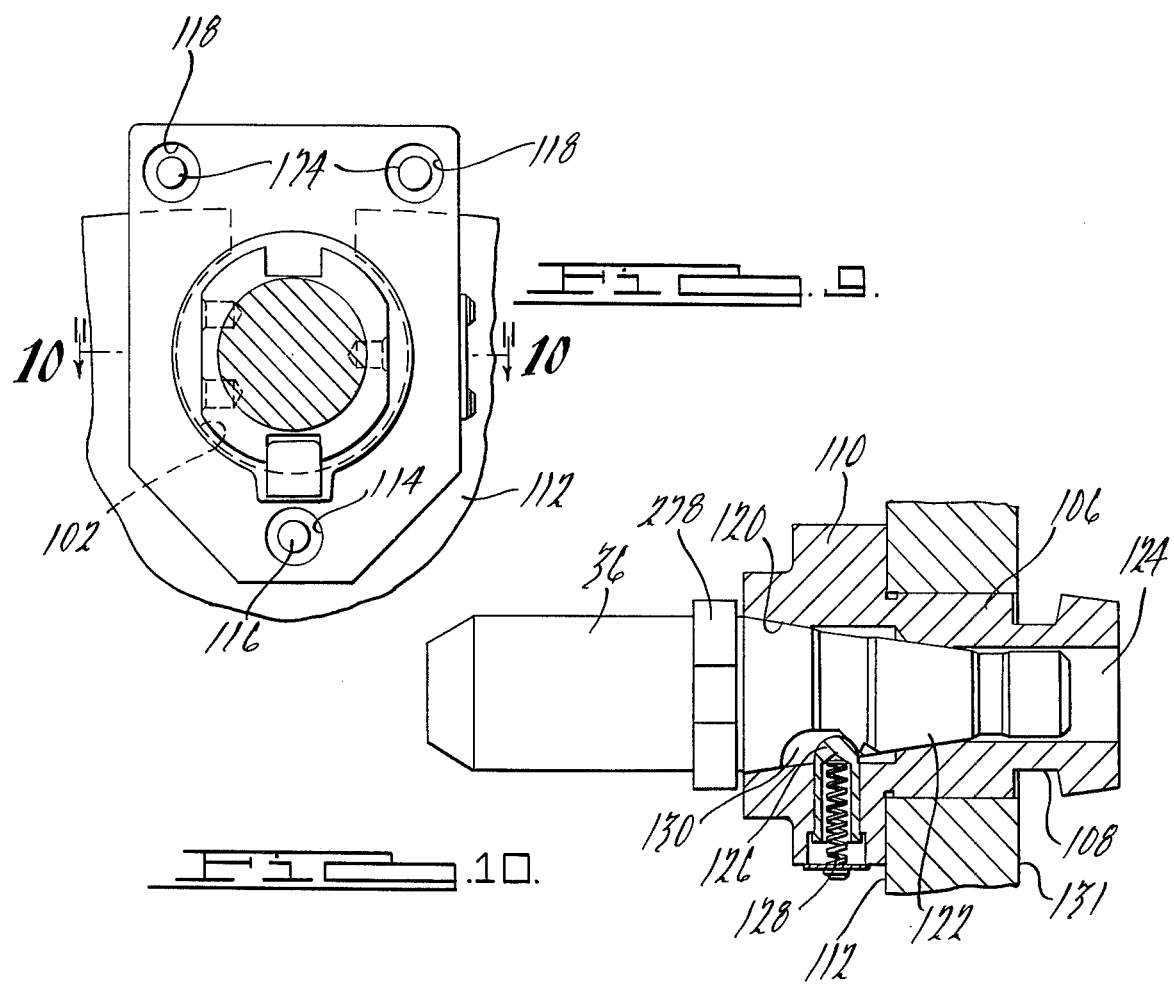
FIG. 9.
FIG. 10.
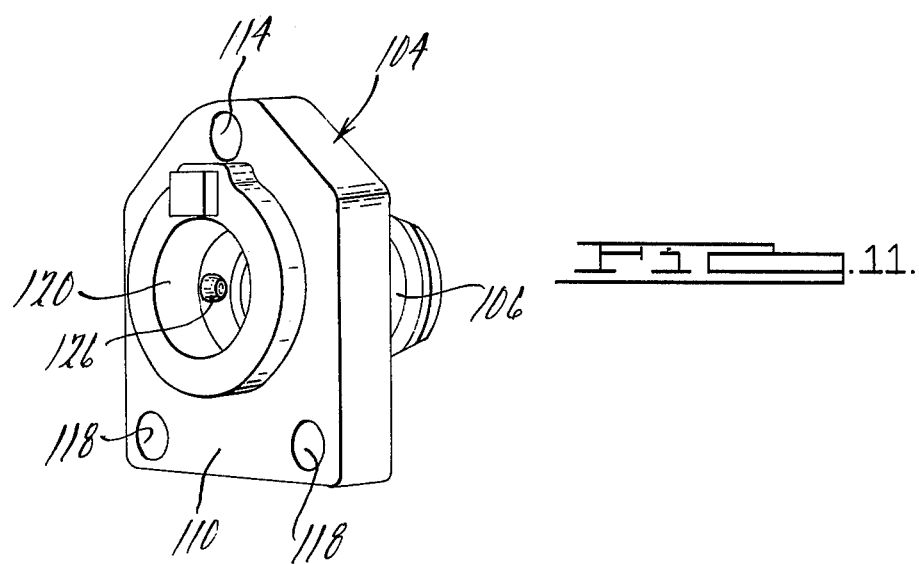
FIG. 11.

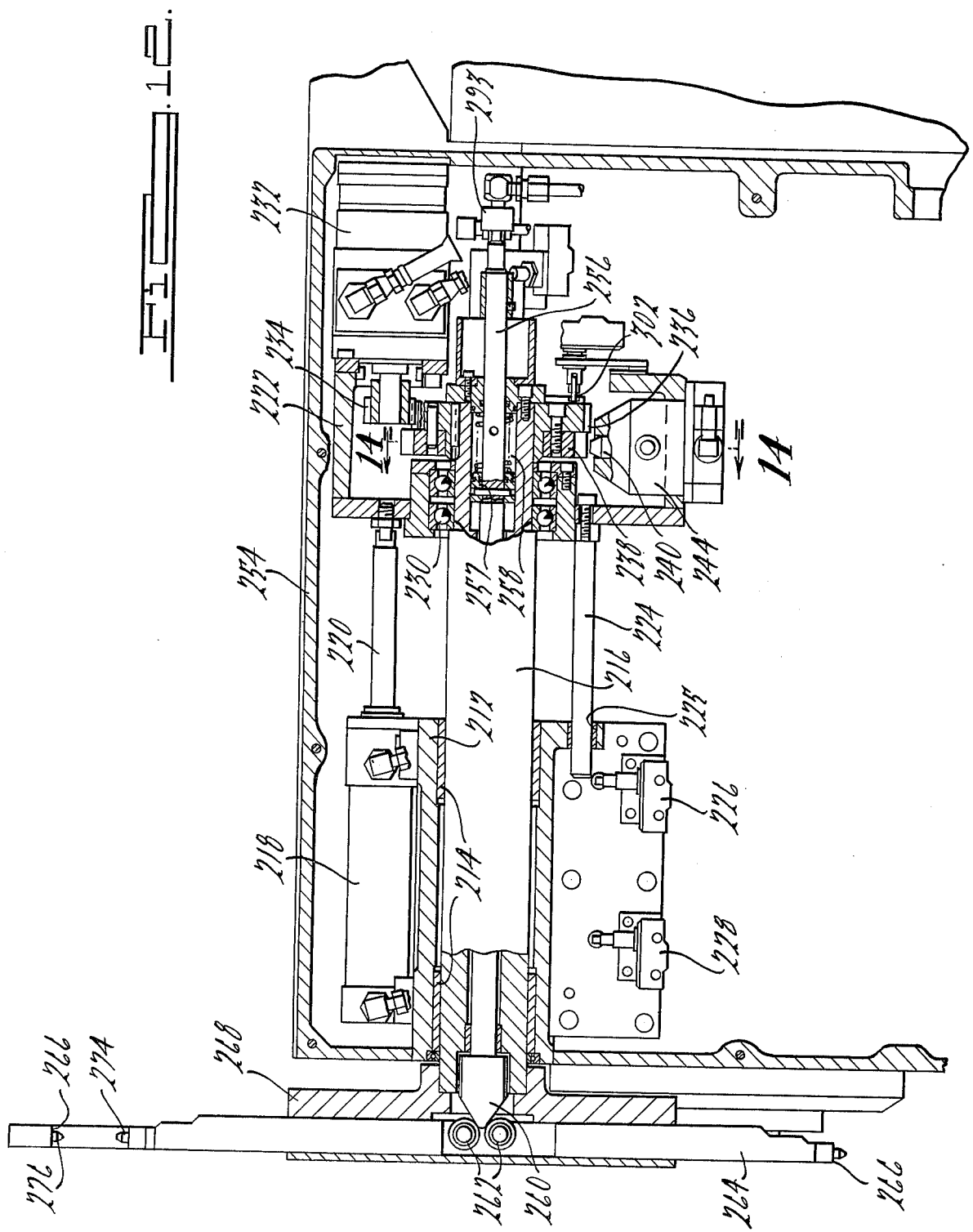

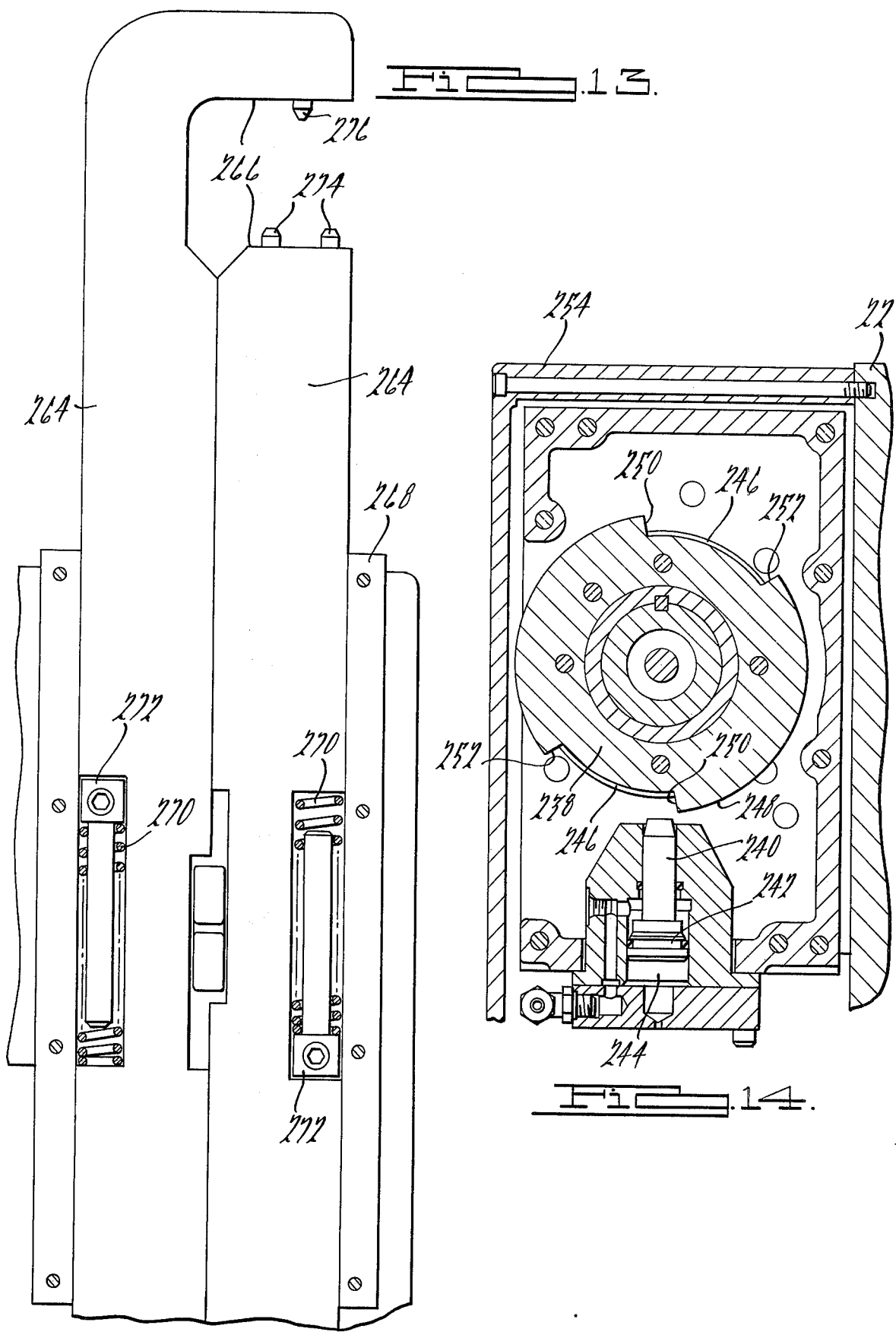

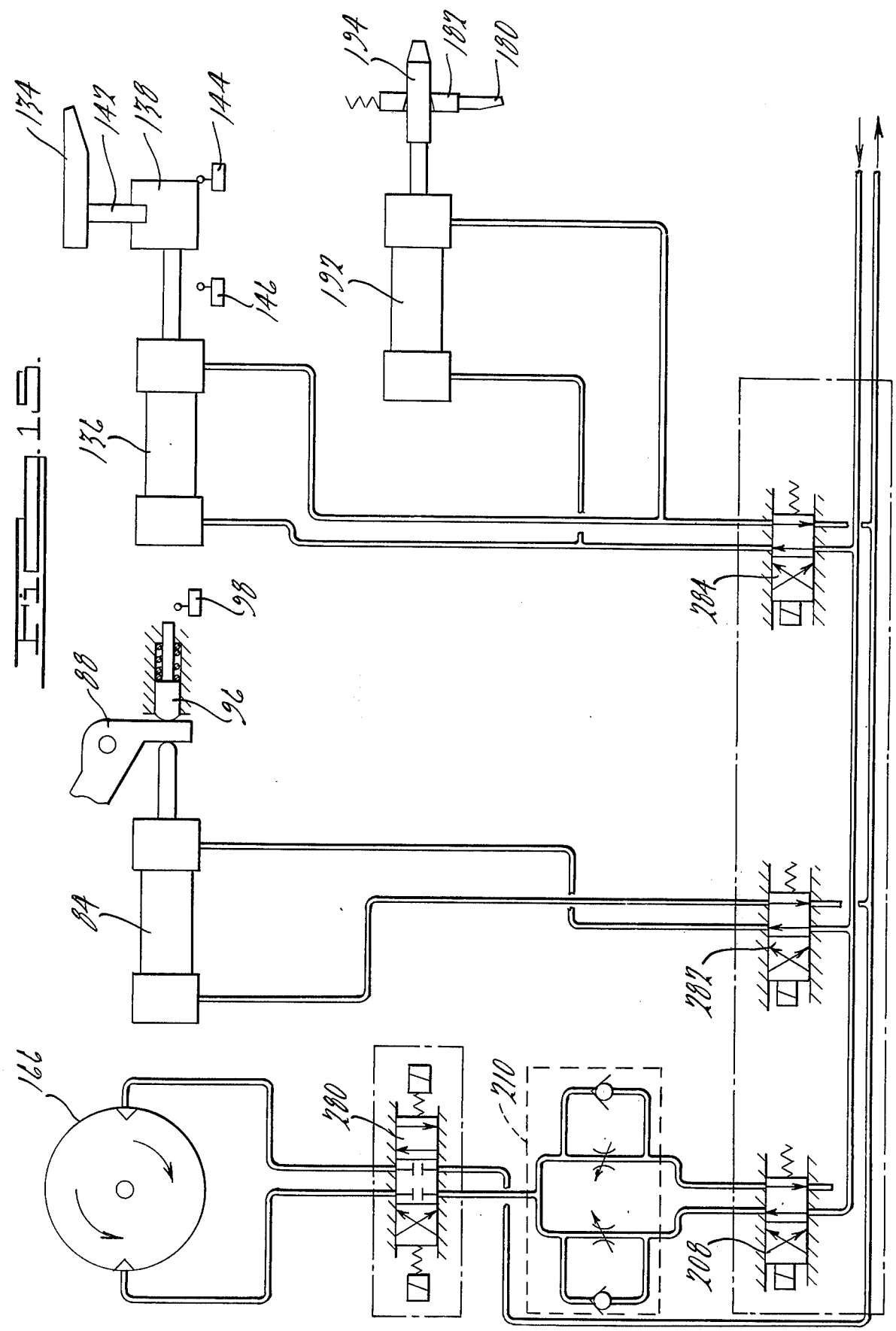

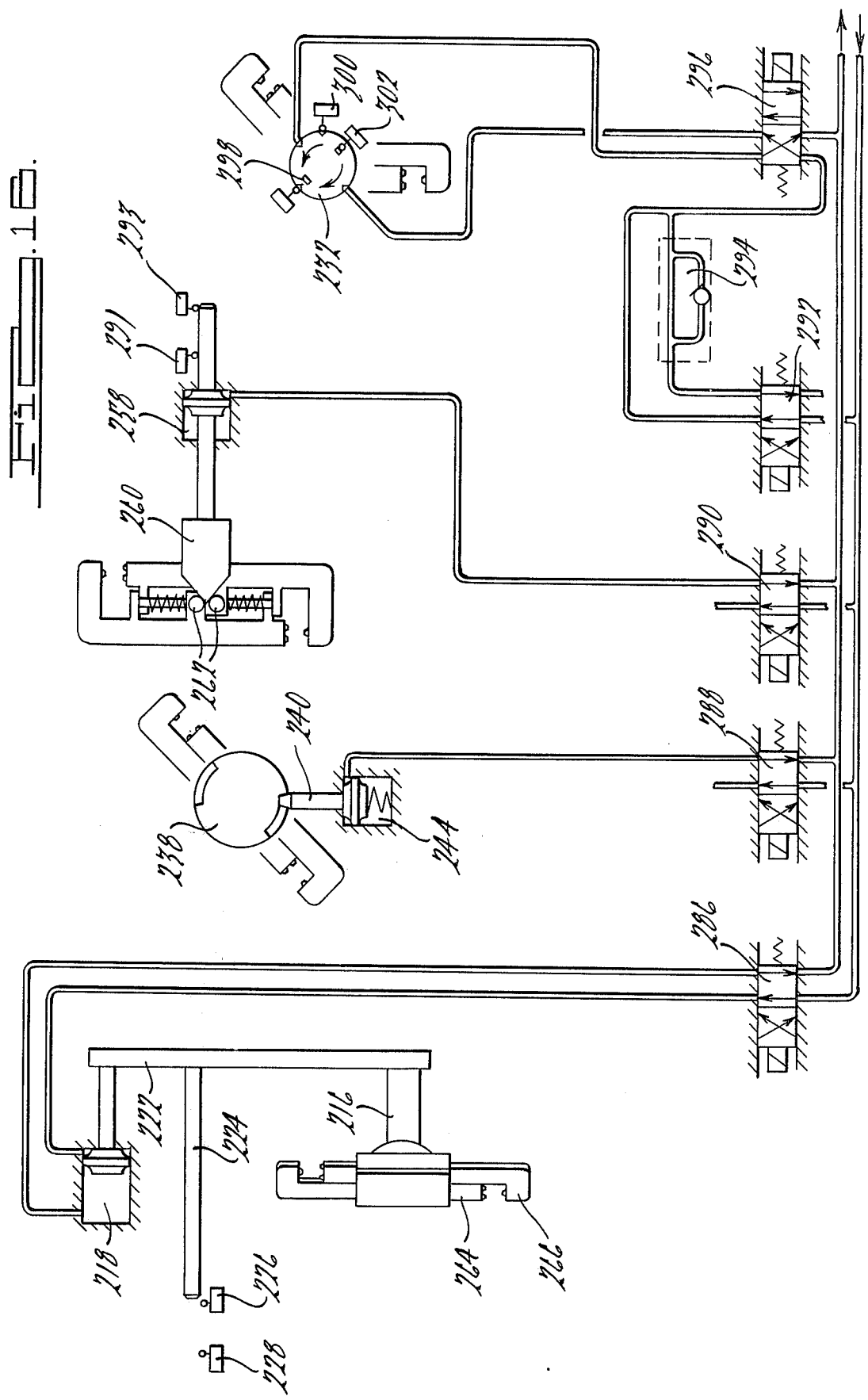

TOOL CHANGER

BACKGROUND OF THE INVENTION

A variety of machine tools have been introduced in recent years which embody the concept of "automatic tool changing". Such machines function automatically (or semi-automatically) under numerical controls and employ a tool storage device in which all of the metal cutting tools to be used on a given workpiece are stored. The tools perform milling, drilling, boring, tapping, reaming and various other metal cutting functions. All of such tools have a shank which is received within the socket of a drive spindle of the machine. Many automatic tool changing machines incorporate some type of tool handling mechanism by which the tool is extracted from a tool storage device and is inserted in the machine spindle. In other machines the entire storage device is moved to position a desired new tool in alignment with the machine spindle and the spindle itself extracts the desired tool from the tool storage member. Many machines have required the use of expensive tools having special flanges or the like which are gripped by a tool handling mechanism or have means for receiving coding rings or the like by which the tool can be identified in the tool storage device. Many tool changing mechanisms have either been extremely bulky and/or expensive in construction or have lacked adequate tool storage capacity. The tool changer of the present invention solves the basic tool handling and identification problems at a minimum cost and without compromising the performance of the machine or imposing undue limitations on the number or types of tools which can be used.

SUMMARY OF THE INVENTION

The tool handler of the present invention is characterized by the use of interchangeable toolholders which support the tools by their shanks both in the tool storage member and during their movement between the storage member and an "interchange position" adjacent the machine tool spindle. The toolholders are extremely simple in design and they are completely interchangeable, the toolholder which is used to bring a new tool to the spindle being used to return an old or previously used tool to the tool storage device. The toolholders are releasably latched in coded positions on a storage wheel and neither the toolholders nor the tools are coded themselves. The tools which are used with the tool changer are of a type previously in common used by a large number of machine tool users. Still other tools can be used with the tool changer of the present invention with minimal machining or alteration thereof.

The tool changer of the present invention is extremely compact in size for the number of tools which it accommodates and may be utilized without impairing the accuracy of the machine tool itself inasmuch as the entire weight ot the tool storage mechanism and the shuttle assembly (by which the tool is transported from the tool storage mechanism to a position adjacent the spindle) is supported independently of the machine tool itself. The tool changer mechanism of the present invention is also extremely rapid in operation, simple in design, easy to program and highly convenient to use. The tool changer may be constructed and sold at a reasonable cost compared to other commercially available tool changers and is both rugged and reliable in performance, the various parts of the tool changer being made to fairly loose dimensional tolerances. The tool changer is of such a design as to minimize or substantially eliminate any danger of dropping a tool during its movement between the tool storage member and the work spindle. The toolholders in which the tools are transported protects the shank of the tools from damage or the buildup of dust or grease which might impair the accuracy of the machining function.

DESCRIPTION OF THE DRAWINGS OF THE PREFERRED EMBODIMENT

FIG. 2 is an enlarged side elevational view of the shuttle assembly portion of the tool changer of FIG. 1;

FIG. 3 is an enlarged sectional view of the structure illustrated in FIG. 2, taken along the line 3—3 thereof;

FIG. 4 is an enlarged rear elevational view, with parts broken away, of the tool storage device and shuttle assembly portions of the tool changer of FIG. 1;

FIG. 5 is an enlarged sectional view of the structure illustrated in FIG. 4, taken along the line 5—5 thereof;

FIG. 6 is an enlarged sectional view of the structure illustrated in FIG. 4, taken generally along the line 6—6 thereof;

FIG. 7, is an enlarged view, with parts broken away, of a portion of the structure illustrated in FIG. 4;

FIG. 8 is an enlarged front elevational view of a portion of the tool changer illustrated in FIG. 1;

FIG. 9 is an enlarged sectional view of the structure illustrated in FIG. 6, taken along the line 9—9 thereof;

FIG. 10 is a sectional view of the structure illustrated in FIG. 9, taken along the line 10—10 thereof;

FIG. 11 is a perspective view of the tool holder shown in FIGS. 9 and 10;

FIG. 12 is an enlarged vertical sectional view of the interchange arm assembly portion of the tool changer illustrated in FIG. 1;

FIG. 13 is an enlarged front elevational view of a portion of the structure illustrated in FIG. 12;

FIG. 14 is an enlarged sectional view of the structure illustrated in FIG. 12, taken along the line 14—14 thereof;

FIGS. 15 and 16 are diagrams schematically illustrating the operation of the various hydraulically operated parts of the tool changer illustrated in the preceding views.

DESCRIPTION OF THE PREFERRED EMBODIMENT

Figure 1:
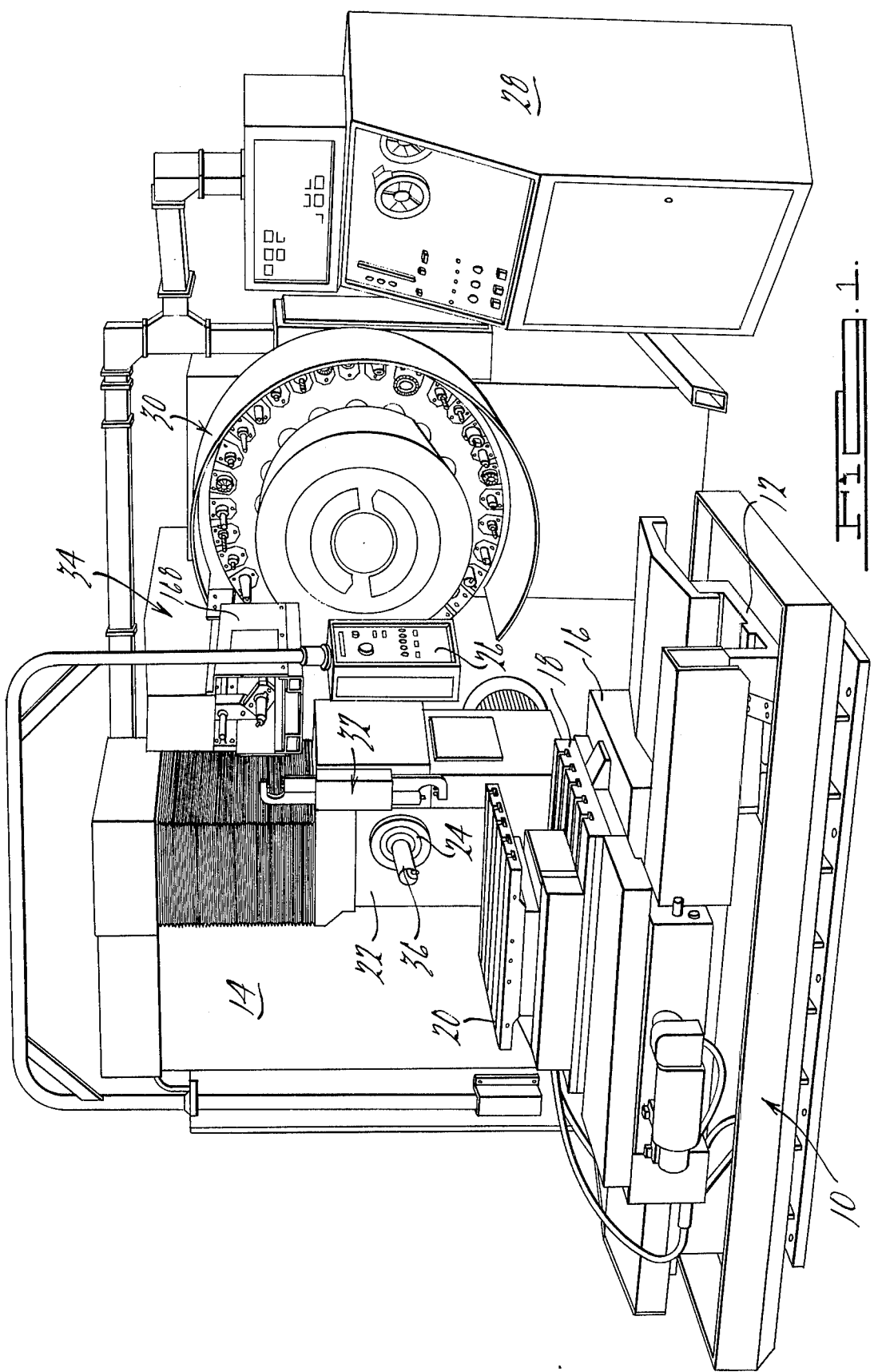
FIG. 1 is a perspective view of a horizontal boring, milling and drilling machine having a tool changer which is constructed in accordance with the present invention and which includes a tool storage device, a shuttle assembly and an interchange mechanism.

Referring now to FIG. 1, a horizontal boring, milling and drilling machine is illustrated at 10. The machine 10 employs a customary bed 12, a vertical column 14 and a saddle 16 mounted on the bed 12 for horizontal rectilinear movement. A table 18 is mounted on the saddle 16 for horizontal movement perpendicular to the direction of movement of the saddle 16. A rotary worktable 20 is shown mounted on the table 18. A conventional spindle head 22 is mounted on the column 14 for vertical movement thereon and carries a rotary drive spindle 24. A pendant control panel is illustrated at 26 where it is conveniently reached by the machine operator. The panel 26 is wired to a numerical control console 28. The console 28 is of the conventional tape programmed type and directs the functioning of the machine 10 and its tool changer subject to the input of certain manual controls from the panel 26. A tool storage device is illustrated at 30 for the storage of a plurality of cutting tools to be used on the machine 10. Tools are transported from the tool storage device 30 to an "interchange" position adjacent the spindle 24 by a horizontal shuttle assembly 34. Tools are interchanged between the shuttle assembly 34 and the spindle 24 by an interchange mechanism 32.

The tool storage device 30 is illustrated in FIG. 1 as containing a large number of cutting tools 36 of diverse type. The shuttle assembly 34 includes a fixed shuttle frame 38 which is mounted on and projects horizontally from a fixed frame 40 of the tool storage device 30. The frame 40 is a free standing, floor mounted structure and neither the frame 38 nor the frame 40 are connected to the machine 10.

TOOL STORAGE DEVICE

Fixed to the frame 40 is a stub axle 44, which supports a tool storage wheel or member 42 for rotation about a fixed axis through bearings 46 and a hub 48. Fastened to the back of the wheel 42 is a large external spur gear 50 which is engaged by a driving pinion 52 (FIG. 4). The pinion 52 is driven by an electric motor 54 through a belt 56, a speed reducer 58 and a shaft 60. Thus, the motor 54 is effective to rotate the wheel 42 about the axis of the stub axle 44.

Rotation of the wheel 42 produces a corresponding rotation of a rod 64 positioned coaxially thereof within a hollow interior of the axle 44. The rod 64 has a non-cylindrical end portion 66 fitted in a similarly shaped opening of a plate 68 fastened to the end of the hub 48. Keyed to the end of the rod 64 opposite from its portion 66 are a plurality of spaced parallel cam plates 70 disposed in operative relationship to a like number of switches 72 and designed to individually actuate the switches 72 through balls 74. The cam plates 70 are mounted within a cam housing 78 while the switches 72 are mounted within a switch housing 76. The cam plates 70 are designed to actuate their switches 72 in accordance with the angular position of the wheel 42. By the selective shaping of the cam plates 70, the switches 72 will produce a different electrical signal for each of a plurality of selected angular positions of the wheel 42. This electrical signal is transmitted to the control console 28 for the purpose of controlling the energization of the electric motor 54 as will be hereinafter described.

Mounted on the rear side of the wheel 42 are a plurality of cylindrical abutments 80 disposed in a spaced circular arrangement. Also mounted on the rear surface of the wheel 42 is a mounting plate 82 supporting an hydraulic cylinder 84 which is designed to actuate an end 86 of a bell crank-shaped lever 88. The lever 88 is pivoted about a pivot 90 and has an end 92 opposite from the end 86 which is designed to engage any one of the abutments 80. The lever end 86 is held against a rod cap 96 of the cylinder 84 by a spring biased pin 94 which also operates a limit switch 98.

The abutments 80 correspond in number and location to a plurality of key-hole shaped tool storage slots 102 cut into the outer periphery 100 of the wheel 42. Each of the slots 102 is designed to receive a pot shaped toolholder 104. Each of the toolholders 104 is of identical configuration and has a barrel portion 106 closely fitted in a slot 102. Each barrel 106 has an annular groove 108 formed in its outer periphery adjacent its rear end. The forward end of each holder 104 is formed with a radially extending flange 110 abutable with a front face 112 of the wheel 42. The flange has a single hole 114 extending through it at the radially inner side thereof which is designed to receive a pin 116 projecting from the front face 112 of the wheel. The pins 116 correspond in number and location to the slots 102. The flange 110 is further provided with a pair of outer through holes 118 which cooperate with the shuttle asembly 34 as will be hereinafter described. Each holder 104 has a tapered socket 120 designed to receive the shank 122 of a tool 36. The tapered socket 120 has a straight cylindrical bore portion 124 adjacent its rear end which is open to the rear end of the holder. A detent 126 is mounted in the holder and is biased by a spring 128 into the bottom of a notch 130 formed in the tool shank 122. The entire tool shank 122 is identical in shape to the shape of the tool illustrated in U.S. Pat. No. 2,816,770, including the notch 130. Tools having this shank configuration are in common use and thus the tool changer mechanism of the present invention will be seen to work with currently available tooling and does not require tooling of a new type.

The wheel 42 is rotationally indexed by the motor 54 to present toolholders 104 successively to what may be termed a "tool removal position". The tool removal position has a coordinate relationship with the shuttle assembly 34 and a toolholder 104 in this position is designed to be extracted from the wheel 42 by the shuttle assembly 34. When the control console 28 produces a signal directing the wheel 42 to present the tool in a particular slot 102 to the tool removal position, the wheel 42 is driven in rotation until this angular position of the wheel is sensed by the switches 72. Actually, the switches 72 will produce the desired signal when the selected slot 102 is just slightly past the tool removal position. In response to the signal produced by the switches 72, the hydraulic cylinder 84 is actuated to withdraw its rod cap 96 and permit the spring biased pin 94 to move the lever end 92 into circular alignment with the abutments 80. When the limit switch 98 senses that the lever end 92 has been so extended, the motor 54 is reversed to cause the lever end 92 to abut one of the abutments 80. At that point the wheel 42 will have been angularly positioned to position the desired tool 36 and its toolholder 104 in the tool removal position.

Mounted on the wheel 42 is a separate latch mechanism 132 for each slot 102. Each latch mechanism 132 incorporates a latch tongue 134 which projects into the groove 108 of the toolholder 104 in its associated slot 102. The latch tongue 134 is inclined to apply a rearward camming force to the toolholder 104 which will hold the tool-holder flange 110 against the front face 112 of the wheel 42. The latch tongue 134 is designed to be held in either a latching position as illustrated in the drawings or a radially inward unlatched position by means of a detent 135.

Mounted on the tool storage frame 40 adjacent the rear of the wheel 42 is an unlatching mechanism which includes an hydraulic cylinder 136 having a slotted fitting 138 mounted on the actuating rod thereof. The fitting 138 has a slot 140 through which pass a plurality of pins 142, each pin 142 being mounted on one of the latch tongues 134. A pair of limit switches 144 and 146 sense whether the fitting is in a radially outward or a radially inward position. The fitting 138 is designed to be held in a normally radially outward position so that the pins 142 will pass freely through the slot 140 when the latch tongues 134 are in their latched or radially outward position. However, when the wheel 42 is indexed to present a selected slot 102 to the tool removal position, the latch pin 142 for that slot will lie within the slot 140. When the cylinder 136 is then actuated to draw the fitting 138 inwardly that particular latch mechanism 132 will be unlatched and the toolholder 104 which is positioned in the associated slot 102 will be released from the wheel 42 and freed for horizontal travel with the shuttle assembly 34 as will be hereinafter described.

SHUTTLE ASSEMBLY

The second of the three major subassemblies of the tool changer comprises the shuttle assembly 34, including its frame 38. Mounted on the frame 38 for horizontal rectilinear movement is a shuttle 150 which rides on a pair of vertically spaced parallel ways in the form of horizontal bars 152. The bars 152 are supported by brackets 154 in such a manner that the shuttle 150 may embrace more than 180° of the periphery of the bars 152. Movement of the shuttle 150 is accomplished by a chain 156 which has its opposite ends connected thereto and is guided by a pair of idler sprockets 158. The chain 156 is driven by a drive sprocket 160 mounted on a drive shaft 162 which is journaled in a bearing housing 164. The drive shaft 162 is driven by an hydraulic motor 166.

The forward end of the shuttle assembly 34 is enclosed within a sheet metal casing 168 to protect the shuttle 150 in its forward position. A collar 170 is mounted on the upper one of the bars 152 at the forward end thereof while a collar 172 is fastened to the lower bar 152 adjacent the rear end thereof. The collars 170 and 172 are designed to limit the forward and rearward travel of the shuttle 150.

The shuttle 150 will be seen to carry a pair of forwardly projecting pins 174 which can be viewed in FIG. 10 as projecting through the outer holes 118 of the toolholder 104. A projection 176 of larger diameter than the pins 174 is mounted on a depending flange 178 of the shuttle 150 in such a position as to enter the bore 124 at the rear end of the toolholder 104.

Looking at FIG. 6, the shuttle 150 will be seen to carry a latch 180 which is integral with a reciprocal block 182. A bore 184 extends transversely through the shuttle 150 in a position slightly offset from but communicating with a tapered opening 186 in the block 182. The latch 180 is normally biased to a latching position illustrated in FIG. 6 by means of a spring 188 seated against a threaded plug 190 fitted in the shuttle 150. The latch 180 is designed to enter the annular groove 108 of the toolholder 104 for securing the toolholder to the shuttle 150. In this latched position the flange 110 of the toolholder 104 will engage a flat front face 191 of the shuttle 150, the pins 174 will be fitted within the holes 118 of the toolholder 104 in the tool removal position and the projection 176 will be disposed within the bore 124 of the toolholder. The latch 180 is retracted by an actuating device which includes an hydraulic cylinder 192 fixed to the frame 38 and a latch actuating pin 194 connected to the piston of the hydraulic cylinder 192. The pin 194 is designed to enter the bore 184 and then wedge its way into the opening 186. The front end of the pin 194 is tapered and cooperates with the opening 186 to cam or bias the latch 180 so that it moves out of the toolholder groove 108.

The shuttle 150 is designed to come to rest in four specific positions on the way bars 152. The movement of the shuttle 150 to these positions is either controlled or monitored by six different limit switches 196, 198, 200, 202, 204 and 206. The four positions of the shuttle are (a) a fully retracted position at which it actuates limit switch 206, (b) a tool removal position at which it actuates limit switch 204, (c) a "ready" position at which it actuates limit switch 200 and (d) a fully advanced or "interchange" position at which it actuates the limit switch 196. Positions a, b and c are shown by broken line representations of the lower portion of the shuttle 150 in FIG. 2. The limit switch 198 is utilized to energize a solenoid actuated valve 208 as the shuttle 150 approaches the advanced or interchange position. When the limit switch 198 is actuated, fluid which powers the hydraulic motor 166 will be directed in a more restricted path through a fluid control device 210 to slow down its rate of flow and thus slow down the speed of the shuttle. This prevents the shuttle from being abruptly stopped for a purpose which will be hereinafter explained. A similar function is performed by limit switch 202 as the shuttle 150 approaches the "ready" position.

INTERCHANGE MECHANISM

FIGS. 12, 13 and 14 show the various parts of the interchange mechanism 32 which is used to interchange tools between the "interchange position" and the machine spindle 24. The interchange mechanism 32 is mounted on the spindle head 22 and includes a support or bracket 212 secured to the spindle head. A long hollow shaft 216 is supported on the support 212 through bearings 214 for both reciprocation and rotation. Mounted on the outer side of the support 212 is an hydraulic cylinder 218 which is connected by a piston rod 220 to a floating housing 222. The floating housing 222 is held against rotation by the piston rod 220 and an anti-rotation rod 224 which slides in a bearing 225 of the hub 212. However, the housing 222 is movable axially of the shaft 216 under the power of the hydraulic cylinder 218. The support 212, housing 222 and related parts are enclosed by a cover 254. The forward and retracted positions of the floating housing 222 are monitored by limit switches 226 and 228 which are actuated by the rod 224.

Supported within the floating housing 222 are bearings 230 which permit the housing 222 to be carried by the shaft 216 without rotating with the shaft 216. An hydraulic motor 232 is carried by the housing 222 and, through a pinion 234, rotates a spur gear 236 keyed to the shaft 216. Fastened to the spur gear 236 is a cam plate 238 which works cooperatively with a retractable stop 240. The stop 240 is mounted on the piston 242 of an hydraulic cylinder 244 so as to be selectively movable in and out of either one of a pair of notches 246 formed in the outer periphery 248 of the cam plate 238. When the stop 240 is positioned in one of the notches 246 it will engage a shoulder 250 disposed at one end of that notch when the shaft 216 is rotated in one direction and it will engage a shoulder 252 disposed at the opposite end of the notch 246 when the shaft 216 is rotated in the opposite direction.

Disposed within the hollow interior of the shaft 216 is a push rod 256 which carries a piston 257. The piston 257 lies in a cylinder bore 258, formed within the hollow interior of the shaft 216. The push rod 256 carries a wedge 260 at its outer end which is inserted between a pair of rollers 262. One of the rollers 262 is carried by each of a pair of parallel arms 264 which are positioned for opposite reciprocal movement within a housing 268 fixed to the outer end of the shaft 216. The arms 264 have cooperating jaws 266 at their opposite ends. The jaw 266 at one end of each arm 264 carries a single pin 276, while a pair of pins 274 are formed on the jaw 266 at the other end thereof. The single pin 276 of one arm 266 faces the pins 274 of the other arm so as to grip therebetween the flange 278 of a tool 36. The configuration of both the tool gripping jaws 266 and the tool flange 278 is identical to that shown in may prior U.S. Pat. No. 3,449,823. The jaws 266 are normally biased toward closed positions by springs 270 which operate against abutments 272 fixed to the housing 268. The space between the pins 276 and 274 is enlarged and the two sets of jaws 266 are forced to open positions by the insertion of the wedge 260 between the rollers 262. By this means the pins 274 and 276 may be positioned on opposite sides of a tool flange 278 and the jaws 266 thereafter closed to insert the pins 274 and 276 into the corresponding holes formed in the flange 278.

OPERATION

Understanding the operation of the tool changer of the present invention is facilitated by reference to FIGS. 15 and 16, which illustrate the operation of the various hydraulically powered components of the system. All movements of the tool changer are powered hydraulically except for the rotation of the tool storage member 42 which is driven by the electric motor 54.

The tool changing function is initiated by rotation of the tool storage member 42 to search for the tool in a selected tool storage slot 102. When the switches 72 produce an electrical signal indicative of the positioning of the selected slot 102 in the tool removal position (actually, just past the tool removal position) a solenoid operated valve 282 is energized and the direction of rotation of the motor 54 is simultaneously reversed. By this means the end 92 of the lever 88 will engage one of the abutments 80 and the tool 36 and toolholder 104 in the selected tool storage slot 102 will be positioned in the tool removal position. During this movement of the member 42, the shuttle 150 is in its fully retracted position where it will actuate the limit switch 206. The movement of the lever 88 is sensed by the limit switch 98 and this signal is utilized to operate the hydraulic motor 166 and produce a slight (about two inch) forward movement of the shuttle 150 into the tool removal position. The shuttle 150 is stopped in this position by abutment of its front face 191 with the toolholder flange 110. The motor 166 stalls with the shuttle 150 in this position. This shuttle movement causes the upper pins 174 of the shuttle to enter the outer openings 118 of the toolholder 104 in the tool removal position and the shuttle projection 176 will enter the rear of the bore 124 of that toolholder.

The arrival of the shuttle 150 in the tool removal position is sensed by the limit switch 204 whereupon a solenoid operated valve 284 is energized to deliver hydraulic fluid to the hydraulic cylinder 192 and the hydraulic cylinder 136. By this means the pin 194, which was previously in a forwardly projected position, is withdrawn from the hole 186 to permit the latch 180 to enter the toolholder groove 108 under the influence of its spring 188. The shuttle 150 is thereby latched to the toolholder 104 in the tool removal position. The delivery of hydraulic fluid to the cylinder 136 causes that cylinder to draw its fitting 138 downwardly to remove the latch 134 from the groove 108 of said toolholder. The toolholder in the tool removal position is thereby unlatched from the tool storage member 42 and the shuttle 150 is freed for continued forward movement by the hydraulic motor 166. This forward movement continues until the shuttle 150 actuates a limit switch 202 at which time the speed of the motor 54 is substantially reduced until the shuttle hits a limit switch 200 at which point the operation of the hydraulic motor 166 is stopped. The selected tool 36 is now in the "ready" position. The purpose of the slowing down of the shuttle 150 prior to completely stopping it in the "ready" position is to prevent possible dislodgement of the tool 36 from the toolholder 104. By very suddenly stopping the movement of the toolholder 104 the high inertia of the tool 36 might cause it to pop out of the toolholder socket 120 against the force of the detent spring 128. By first slowing down the shuttle 150 and then stopping it, this possible accidental loss of the tool 36 from the toolholder 104 in this manner is averted.

A newly selected tool 36 and its toolholder 104 remain in the "ready" position while the preceding machining operation is in progress. During this time the interchange arms 264 are positioned in a vertical attitude with the shaft 216 fully retracted. When that machining operation is completed, the spindle 24 is fully retracted and is angularly oriented to a preset position. The angular and axial positioning of a machine tool spindle is well known in the art and no special means for accomplishing this function is illustrated herein. The spindle head 22 is then indexed on the column 14 to a preset height so that the interchange mechanism 32 (which is positioned on the spindle head) will register with a tool 36 presented to it by the shuttle 150. Before actual interchange of the old and new tools, it may also be necessary to move the machine table 18 away from the spindle. Such a movement, however, must be programmed into the machine and is only done when using very long tools which might interfere with a work-piece on the table.

The final movement of the tool changer prior to the actual "interchange" function is the forward movement of the shuttle 150 from the "ready" position into an "interchange" position. This is accomplished by the operation of the valve 280 (FIG. 15) to deliver hydraulic fluid to the motor 166 in a forward direction. This will drive the chain 156 to move the shuttle 150 forwardly until it actuates the limit switch 198. The operation of the limit switch 198 will actuate the valve 208 to cause the hydraulic fluid flowing to the motor 166 to be delivered through the low speed orifices of a restrictor mechanism 210. The movement of the shuttle 150 is thus slowed down until its stalls against the collar 170 and actuates limit switch 196. The new tool 36 is now in the interchange position and is ready to be interchanged with a previously used tool in the machine spindle 24.

The solenoid 296 now is actuated to angularly index the interchange arms 264 45° so that the jaws 266 of the interchange arms will be poised over the flanges 110 of the tools 36 in the spindle 24 and in the interchange position. As the interchange arms approach the 45° position, a limit switch 300 is actuated to operate a solenoid valve 292 which will alter the flow of fluid flowing to the hydraulic motor 232 so that is flows through the low speed orifices of a restrictor mechanism 294. The arrival of the interchange arms 264 in the 45° tool changing position is sensed by limit switches 298 and 302. The jaws 266 of the interchange arms are then closed to grip the tools 36 in the spindle 24 and in the interchange position. The tool in the spindle 24 is then released from the spindle by a conventional drawbolt (not shown) which is customarily used to hold a tool in a machine spindle. The interchange shaft 216 is then moved axially outwardly to move the old tool out of the spindle and to extract the new tool from its toolholder 104. When the tool 36 is pulled out of its toolholder 104, the spring loaded detent 126 simply snaps out of the tool recess 130. The full forward extension of the interchange arms 264 is sensed by the limit switch 228, which causes the interchange arms to rotate 180°. This is accomplished by withdrawing the abutment member 240 through energization of the solenoid 288 and reversing the direction of energization of the hydraulic motor 232 by actuation of the solenoid 296. When the interchange arms approach the 180° reversed position, this is sensed by one of the limit switches 298, 302, to actuate the solenoid valve 288 and re-extend the abutment member 240. The cam plate shoulder 250 or 252 will engage the abutment 240 and the hydraulic motor 232 will stall to hold the parts in this position at which the new tool will be aligned with the spindle 24 and the old tool will be aligned with the toolholder 104 in the interchange position. The interchange mechanism shaft 216 is then retracted to insert the new tool in the spindle and the old tool in the toolholder 104 in the interchange position. This function is, of course, accomplished by operation of the valve 286 to deliver hydraulic fluid to the cylinder 218 in such a direction as to retract its piston. The jaws 266 are then reopened and the arms 264 angularly indexed 45° to a vertical or parked position.

During the use of the interchange arms 264, the shuttle 150 remains stalled against the collar 170 in the forward position holding the toolholder 104 which was used to deliver the new tool to the interchange position. That same toolholder 104 is now used to receive the old or previously used tool from the spindle 24 and will remain with that old tool in the tool storage member 42 until that tool is next called upon to perform a machining operation.

During the prevously described tool interchanging function it is to be noted that the tool storage member 42 remains with an open or unoccupied slots 102 for both the old and the new tools. While the open slot for the new tool is initially in the "tool removal" position, the tool storage member is now indexed to present the slot 102 for the old tool to "tool removal" position.

The valve 280 is now actuated to reversely drive the hydraulic motor 166 and thereby retract the shuttle 150. During such retraction the shuttle 150 passes through the "ready" position until the flange 110 of the toolholder 104 on the shuttle 150 abuts the front face 112 of the tool storage member 42. At this point the hydraulic motor 166 simply stalls with the shuttle in that position. The arrival of the shuttle 150 at the tool storage member 42 is sensed by the limit switch 204 to actuate the valve 284. When this is done the pin 194 is moved forwardly into the block 182 to retract the shuttle latch 180. Simultaneously, the hydraulic cylinder 136 is operated to extend its fitting 130 and engage the latch 134 in the tool removal position to the toolholder 104 which is now in that position. When this is accomplished the shuttle 150 is no longer held to the member 42 and it may continue its rearward movement an additional two inches to a fully retracted position at which it abuts the collar 172 and the hydraulic motor 166 stalls with the shuttle in this position. The tool storage member 42 may then be angularly indexed by the electric motor 54 to search for a tool 36 which is to be used in the next machining function. Thus, the cycle is repeated to extract a still additional tool from the member 42 and bring it to the "ready" position while the previously selected tool completes its machining function.

It should be mentioned that the tool storage slots 102 are not necessarily equally spaced about the wheel periphery 100. In practice it has been found desirable to space most of the slots only far enough apart to accommodate most of the tools. Only a small minority of the tools used in almost all machining operation have a very large radial dimension. Therefore only a small number of the slots 102 are spaced widely apart to accommodate such large diameter tools. It is only necessary to space the abutments 80 and shape the cam plates 70 in accordance with the location of the slots 102 and this may be done to suit whatever slot locations are desired.

It should also be noted that the tool changer of the present invention uses one less toolholder 104 than there are slots 102. There must always be a completely empty slot 102 for the tool which is in the spindle 24. That tool is returned to its slot 102 in the toolholder for the next tool which is to be used and this function would be prevented by the presence of an empty toolholder in its slot.

I claim:

1. A tool changing mechanism for a machine tool having a drive spindle carried by a movable spindle head and adapted to receive the shank of a tool, said mechanism including:
    a tool storage member mounted independently of the machine tool,
    a plurality of tool holders releasably secured to said tool storage member and each operable to support a tool by engagement with the shank thereof,
    said tool storage member being indexable to present tool holders and their tools successively to a tool removal position,
    means for unlatching a tool holder in said tool removal position,
    a shuttle frame mounted in a fixed position with respect to said machine tool and independently of the machine spindle head and extending between said tool removal position and an interchange position,
    a shuttle linearly movable on said shuttle frame to engage a tool holder in said tool removal position and transfer such tool holder and its tool to said interchange position, and
    an interchange mechanism mounted on the machine tool and operable to engage a tool supported by a tool holder in the interchange position, remove such tool from its tool holder and insert such tool in the machine tool spindle.

2. The structure set forth in claim 1 in which said interchange mechanism is provided with two opposite tool gripping portions operable simultaneously to grip tools in said spindle and in the tool holder in said interchange position and interchange said tools.

3. The structure set forth in claim 1 in which said tool storage member has a plurality of slots formed in spaced locations about the outer periphery thereof, said shuttle having a portion movable through a slot in said tool removal position for removing a tool from said position.

4. The structure set forth in claim 1 in which said tool holders project beyond a peripheral surface of said tool storage member and in which said shuttle engages a tool holder in said tool removal position by straight line movement from the side thereof opposite from said interchange position.

5. The structure set forth in claim 1 in which said shuttle is driven by a hydraulic motor into engagement with a tool holder in said tool removal position and in which said shuttle stalls against a tool holder in said tool removal position until the tool holder in said position is unlatched.

6. The structure set forth in claim 1 in which said tool storage member is mounted on a free standing storage member frame and in which said shuttle frame is mounted on said tool storage member frame.

7. The structure set forth in claim 1 in which said tool holders are provided with flanges having at least one aperture operable to receive a pin on said shuttle and a socket for receiving the shank of a tool to be used in the machine tool, said socket being open at its rear end for reception of a projection on said shuttle.

8. The structure set forth in claim 7 in which said tool holders are provided with barrel portions defining said socket, said barrel portions having a groove on the outer periphery thereof operable to receive a latch on said shuttle.

9. The structure set forth in claim 1 including a latch carried by said shuttle for latching a tool holder in the tool removal position to said shuttle and means for effecting the simultaneous engagement of said shuttle latch and unlatching of the tool holder in said tool removal position from said tool storage member.

10. The structure set forth in claim 9 in which said shuttle latch is spring biased to a closed position and means adjacent the tool removal position for unlatching said shuttle latch when said shuttle is in engagement with a tool holder in the tool removal position.

11. The structure set forth in claim 1 in which the linear movement of said shuttle is parallel to the axis of the machine tool spindle.

12. The structure set forth in claim 1 in which said tool holders are latched to said tool storage members in coded locations on said tool storage member.

13. The structure set forth in claim 12 in which some of said tool storage locations are variably spaced with respect to the remainder of said tool storage locations.

14. The structure set forth in claim 1 including means for stopping said shuttle in a ready position intermediate said tool removal and said interchange positions whereby a tool holder and tool removed from said storage member may be held at said ready position until the completion of a preceding machining operation.

15. The structure set forth in claim 1 in which said tool holders are provided with apertures receiving projections on said shuttle upon the linear movement of said shuttle into engagement with a tool holder in said tool removal position.

16. The structure set forth in claim 1 including a tool storage frame on which said tool storage member is rotatably mounted, said shuttle frame being supported entirely on said tool storage frame.

* * * * *